US010539449B2

(12) United States Patent
Faber et al.

(10) Patent No.: US 10,539,449 B2
(45) Date of Patent: Jan. 21, 2020

(54) RADAR FILL LEVEL MEASUREMENT DEVICE

(71) Applicant: Endress + Hauser GmbH + Co. KG, Maulburg (DE)

(72) Inventors: Harald Faber, Lorrach (DE); Alexey Malinovskiy, Maulburg (DE)

(73) Assignee: ENDRESS+HAUSER SE+CO. KG, Maulburg (DE)

(*) Notice: Subject to any disclaimer, the term of this patent is extended or adjusted under 35 U.S.C. 154(b) by 306 days.

(21) Appl. No.: 15/505,747

(22) PCT Filed: Aug. 19, 2015

(86) PCT No.: PCT/EP2015/069045
§ 371 (c)(1),
(2) Date: Feb. 22, 2017

(87) PCT Pub. No.: WO2016/030252
PCT Pub. Date: Mar. 3, 2016

(65) Prior Publication Data
US 2017/0254692 A1 Sep. 7, 2017

(30) Foreign Application Priority Data

Aug. 29, 2014 (DE) .................. 10 2014 112 453

(51) Int. Cl.
G01F 23/284 (2006.01)
H01P 3/06 (2006.01)
(52) U.S. Cl.
CPC .............. G01F 23/284 (2013.01); H01P 3/06 (2013.01)
(58) Field of Classification Search
CPC .................................. G01F 23/284; H01P 3/06
(Continued)

(56) References Cited

U.S. PATENT DOCUMENTS 7,010,973 B2 3/2006 Bartoli et al.
7,586,435 B1 9/2009 Edvardsson
(Continued)

FOREIGN PATENT DOCUMENTS

CN 101162268 A 4/2008
CN 102016524 A 4/2011
(Continued)

OTHER PUBLICATIONS

Chinese Office Action in corresponding Chinese Application No. 201580045082.4, dated Dec. 27, 2018.
(Continued)

Primary Examiner — Timothy A Brainard
(74) Attorney, Agent, or Firm — Bacon & Thomas, PLLC

(57) ABSTRACT

A radar based fill level measurement device for measuring the fill level of a material in a container, comprising an electronics unit, wherein the electronics unit serves to generate a transmission signal, and serves to process a received signal. The received signal containing a reflected portion of the transmission signal, and the reflected portion being reflected from a surface of the material whose distance is to be measured. The electronics unit comprises a signal generator to generate a frequency modulated transmission signal, wherein the electronics unit comprises a processor to process the received signal using phase information comprised in the received signal, and wherein the radar device comprises a coaxial waveguide probe arranged in the container, wherein said coaxial waveguide probe serves for guiding the transmission signal (TX) and the received signal (RX).

7 Claims, 2 Drawing Sheets

(58) Field of Classification Search
USPC .......................................................... 342/124
See application file for complete search history.

(56) References Cited

U.S. PATENT DOCUMENTS

| | | | |
|---|---|---|---|
| 7,636,059 B1 | 12/2009 | Edvardsson | |
| 7,965,087 B2 * | 6/2011 | Reimelt | G01F 23/284 |
| | | | 324/533 |
| 9,075,144 B1 * | 7/2015 | Straub | G01S 13/882 |
| 2007/0165488 A1 * | 7/2007 | Wildey | G01F 1/66 |
| | | | 367/101 |
| 2008/0105048 A1 * | 5/2008 | Nilsson | G01F 23/284 |
| | | | 73/290 V |
| 2009/0302867 A1 | 12/2009 | Schroth et al. | |
| 2009/0303106 A1 | 12/2009 | Edvardsson | |
| 2013/0300595 A1 | 11/2013 | Hemmendorff | |
| 2014/0085132 A1 * | 3/2014 | Jirskog | G01F 23/284 |
| | | | 342/124 |

FOREIGN PATENT DOCUMENTS

| | | |
|---|---|---|
| CN | 102313587 A | 1/2012 |
| CN | 103245395 A | 8/2013 |
| CN | 103502782 A | 1/2014 |
| DE | 102012101725 A1 | 9/2013 |
| DE | 102014112453 A1 | 3/2016 |
| WO | WO2013041148 A1 | 3/2013 |

OTHER PUBLICATIONS

German Search Report, German Patent Office, Munich, DE, dated May 18, 2015.
International Search Report, EPO, The Netherlands, dated Nov. 4, 2015.
English Translation of the International Preliminary Report on Patentability, WIPO, Geneva, CH, dated Mar. 9, 2017.
Chinese OA issued in corresponding Chinese Appln. No. 201580045082.4 dated Aug. 5, 2019.

* cited by examiner

RADAR FILL LEVEL MEASUREMENT DEVICE

TECHNICAL FIELD

The invention relates to a radar device for measuring the fill level of a material in a container, comprising an electronics unit, wherein the electronics unit serves to generate a transmission signal, and serves to process a received signal, the received signal containing a reflected portion of the transmission signal, and the reflected portion being reflected from a surface of the material whose distance is to be measured.

BACKGROUND DISCUSSION

Many applications where the fill level of a material in a container or a tank is measured require that the fill level be determined with a high degree of accuracy and/or precision. For example, in the pharmaceutical or food and beverage industries, accurate amounts of liquids need to be determined precisely for reaction processes. Accurate determinations of the amounts of material in containers are also required in the oil and gas industry, for example, where monetary transactions are based on the precise amount of material that is to change hands.

One of many methods for determining the fill level of a material in a container is through the use of radar based measurement devices. Radar based measurement devices come in many forms, but can generally be classified into two groups. These two groups are often referred to as "freely emitting" devices and "guided wave" devices.

A measurement device in the sense of the present invention is not to be understood as being restricted to a unitary collection of hardware components but can also be a system of spatially separated units. A measurement device can be viewed as comprising a transducer and a transmitter, wherein the transducer serves to convert a process variable, such as the fill level of a material in a tank, into an electrical signal, and wherein the transmitter serves to sample and process this electrical signal in order to produce a value for the process variable that corresponds to a physical situation that is to be measured. The transmitter, as the case may be, can further serve to transmit and/or save the determined process value for further use. The transducer generally comprises a microprocessor or microcontroller and various other electrical and electronic circuits. The transducer and the transmitter can be concentrated in a single unitary device, or they can be spatially separated. In the case where they are spatially separated, some sort of communication means, such as a cable or a wireless communication means, is provided. The distinction between transmitter and transducer can not always be strictly applied, as the transducer in some cases serves to preprocess a measurement signal and sometimes even comprises a microprocessor.

Guided wave radar measurement devices are used to measure the fill level of containers in applications where it is advantageous to concentrate the transmitted microwave energy around the waveguide. Signal losses can thereby be avoided, and power requirements can be reduced. The transmission signal for a guide wave radar device generally comprises electromagnetic pulses. The pulses are repetively produced at regular intervals of time. The time between pulses can be in the nanosecond range. After being produced, these pulses are coupled onto and guided along a wave guide, for example a cable or rod, in the direction the material that is to be measured. At the material interface, there is a sudden change in the dielectric constant—the change being proportional the difference between the dielectric constant of the material and the dielectric constant of a transmission medium that is between the radar device and the material, which is usually gaseous and, in particular, is usually air. A portion of the transmitted energy is reflected at this material interface due the change in impedance. This reflected portion of each pulse is then guided back to the radar device along the waveguide and sampled.

There are various means of sampling this pulsed signal. Commonly, a method is used in which the reflected pulses are mixed with a second pulsed signal that is generated in the measurement device. This secondary pulsed signal is produced with a repetition rate that differs slightly from the first pulsed signal so as to cause a stroboscopic effect that permits the received pulsed signal to be stretched in the time domain. This "stretched" signal can then be sampled with an analog to digital converter, wherein the converter is required to have a lower sampling rate than would normally be necessary in order to sample pulses in the nanosecond time range. The fill level measurement can be carried out based on time of flight methods. In principle, the time delay between the transmission and reception of a pulse corresponds to the distance between the radar measurement device and the material.

The magnitude of the change in the dielectric constant at the material interface plays a critical role in determining the signal strength of the reflected portion of each pulse. The signal strength decreases with a decrease in the magnitude of the change in the dielectric constant. In fill level measurement applications where the material to be measured has a small dielectric constant, a corresponding increase in the strength of the transmitted signal is necessary in order to insure that the reflected portion of the signal remains detectable. However, in order to increase the strength of the transmitted signal, the breadth of the pulses that are generated must be increased. This has the disadvantageous effect of decreasing the resolution with which the fill level measurement can be carried out. The resolution and/or precision of a fill level measurement of a guided wave radar measurement device is dependent on the sharpness of the pulses that are generated and transmitted.

In the US patent publication US 2013/0231877 A1 a method is disclosed for evaluating reflected measurement pulses of an electromagnetic signal that are transmitted along, for example, a coaxial probe arranged in a container. The method involves applying expectation values to received pulses in order to determine which pulse corresponds to the fill level in the event that there is an interference layer in the container. It is further disclosed that the method disclosed can be used on the spectrum of the intermediate frequency in an FMCW process instead of on the signal amplitude in the time range in order to thus measure the fill level of a material which is superimposed with at least one interference layer. The accuracy of the measurement is increased by reliably determining which pulse corresponds to the fill level of the material, and the precision of the measurement is increased by taking into account the effect of the interference layer on the time of flight of the electromagnetic signal.

SUMMARY OF THE INVENTION

The principle object of the invention is to provide a guided wave radar measurement device that can carry out a accurate and precise measurement independent of signal strengths requirements.

The object of the invention is achieved with a radar based fill level measurement device for measuring the fill level of a material in a container, comprising an electronics unit, wherein said electronics unit serves to generate a transmission signal, wherein said electronics unit serves to process a received signal, said received signal containing a reflected portion of the transmission signal, said reflected portion being reflected from a surface of the material whose distance is to be measured, wherein the electronics unit comprises a signal generator to generate a frequency modulated transmission signal, wherein the electronics unit comprises a processor to process the received signal using phase information comprised in the received signal, and wherein the radar device comprises a coaxial waveguide probe, wherein said coaxial waveguide probe serves for guiding the transmission signal and received signal. The method of US 2013/0231877 A1 is disclosed in a general way as being applicable to the intermediate frequency signal in an FMCW process, but there is no disclosure that a frequency modulated signal can be transmitted along coaxial waveguide probe. Furthermore, there is no hint that the phase information of the received signal that is guided by the coaxial waveguide probe can be used to increase the accuracy and precision of the fill level measurement.

The use of a frequency modulated transmission signal permits the use of frequency modulated continuous wave (FMCW) radar signal processing methods, in which the accuracy and precision of the measurement is largely independent of the strength of the transmission signal. FMCW radar in combination with a coaxial waveguide probe is especially advantageous because the dispersive effects that generally accompany applications of FMCW radar techniques for fill level measurement applications are completely avoided, since the coaxial waveguide probe can transmit TEM modes. Furthermore, the use of phase information that is included in the reflected signal permits the determination of the fill level in a container to within +/−0.5 mm of the actual fill level. This is better than that which was previously possible by a factor of 10.

In an advantageous embodiment of the radar based fill level measurement device the processor calculates an expected phase response of the received signal as a function of the distance of the surface of the material. The expected phase response can be calculated based on information that can be stored in a memory of the electronics unit, such as time delay factors of various components of the electronics unit, wavelength of the generated transmission signal, rate of change of the frequency in the frequency modulated transmission signal, etc. However, the expected phase response can also be determined in a calibration procedure in which the distance of the surface of the material in the container is controlled, and the phase response is observed at varying distance. Generally, the expected phase response for the entire distance measuring range can be calculated by the processor on the basis of two calibration measurements. Calculating the expected phase response is made much simpler through the avoidance of dispersive effects that normally plague FMCW radar systems. In particular, the calculation can be carried out with fewer steps, which advantageously increases the processing speed of the electronics unit and/or reduces the processing capability requirements of the electronics unit, so that a simpler and less expensive processor can be used.

In a further development of the advantageous embodiment of the radar based fill level measurement device, the processor determines the phase of the received signal at a frequency peak of the received signal, wherein said frequency peak corresponds to said distance, and the processor compares said determined phase with the expected phase response at said distance. The result of this comparison can be used to correct the distance measurement of the fill level measurement device. By avoiding dispersive effects through the use of a coaxial waveguide probe, the computational complexity associated with the determination of the phase of the received signal is also reduced.

In an advantageous embodiment of the radar based fill level measurement device a wave impedance of said coaxial waveguide probe corresponds to an output impedance of said electronics unit.

In a further development of the advantageous embodiment of the radar based fill level measurement, said wave impedance is adjusted through an adjustment of the inner diameter of the outer conductor of the coaxial waveguide probe.

In an advantageous embodiment of the radar based fill level measurement device the processor determines the placement of the frequency peak in a frequency spectrum of an intermediate frequency signal by interspersing additional frequency points in between and/or adjacent to sampled frequencies obtained by the fast fourier transform of the of the intermediate frequency signal sampled by an analog to digital converter of the electronics unit, wherein said sampled frequencies comprise respective spectral amplitudes that are greater than a predetermined amplitude threshold.

In a further development of the advantageous embodiment of the radar based fill level measurement device the processor performs a discrete fourier transform at the sampled frequencies and additional frequency points.

In an alternative further development of the advantageous embodiment radar based fill level measurement device the processor applies a generalized goetzel algorithm at the sampled frequencies and additional frequency points.

In a further development of the embodiment of the radar based fill level measurement device the processor determines the phase of the frequency peak by applying the generalized goetzel algorithm at an additional frequency point or a sampled frequency in the frequency peak, wherein said frequency point or a sampled frequency comprises a greater spectral amplitude than any adjacent frequency point or a sampled frequency.

BRIEF DESCRIPTION OF THE DRAWINGS

The invention will now be described in more detail with the help of the following figures. They show:

FIGS. 2 and 2b: are graphical displays of the intermediate frequency signal that contains phase information and the amplitude of an echo signal as a function of distance.

DETAILED DISCUSSION IN CONJUNCTION WITH THE DRAWINGS

Figure 1:
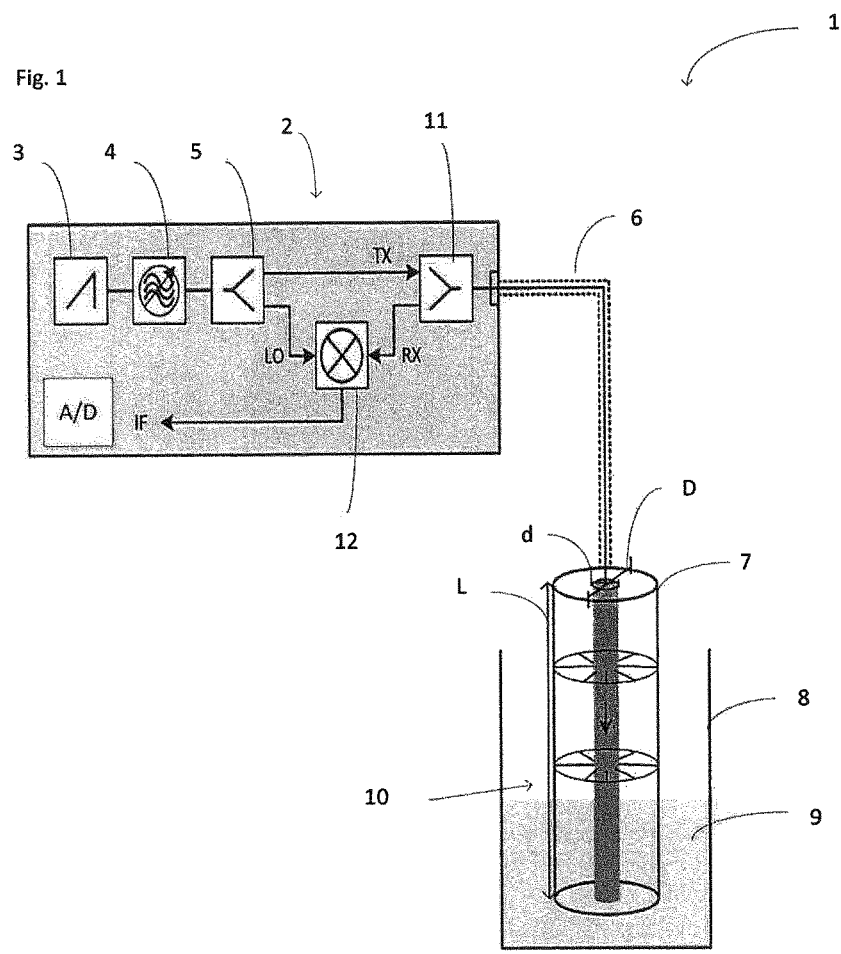
FIG. 1: is a schematic diagram of the guided wave radar measurement device.

In FIG. 1 a schematic diagram of a guided wave radar measurement device 1 is shown. An electronics unit 2 is shown, which comprises a first functional block 3 in which a linearly increasing voltage signal is generated. This signal serves as an input for a second functional block 4 wherein a high frequency oscillator generates a linearly increasing frequency modulated transmission signal TX on the basis of the input signal. This transmission signal TX is output to a first divider 5. The transmission signal TX is then coupled, by means of a high frequency cable 6, onto a coaxial waveguide probe 7. The coaxial waveguide probe 7 is shown to extend into a container 8 that is partially filled with a material 9. The coaxial waveguide probe 7 carries the transmission signal TX in a TEM Mode to the material interface 10 where at least a portion of the transmission signal TX is reflected as a received signal RX. The received signal RX is then guided back up the coaxial waveguide probe 7 over the high frequency cable 6 and fed through a second divider 11 to a mixer 12. In the mixer 12, the received signal RX is mixed with the transmission signal TX that is continuously being generated. The portion of the transmission signal that is fed over the first divider 5 to the mixer 12 is referred to as the local oscillator signal LO. Due to the time delay ΔT between transmission and reception of the frequency modulated signal TX, RX, there is a frequency difference of between the received signal RX and the local oscillator signal LO which corresponds to the total travel time ΔT of the transmission and received signal TX, RX along the coaxial waveguide probe 7. The output of the mixer 12 is a signal comprising this frequency difference Δf, which is referred to as the intermediate frequency signal IF. The intermediate frequency signal IF can then be sampled with an analog to digital converter A/D, the result of which is a digital intermediate frequency signal IF.

The wave impedance of the coaxial waveguide probe 7 and the output impedance of the electronics unit 2 are matched in order to maximize the efficiency of the signal coupling into the coaxial waveguide probe 7. The wave impedance of a coaxial waveguide probe 7 is determined by the spatial dimensions of the coaxial waveguide probe 7 such as the diameter d of the inner conductor and the diameter D of the outer conductor. For a frequency modulated transmission signal TX of approximately 6 GHz, a coaxial waveguide probe 7, where the inner conductor has a diameter d of approximately 8 mm and where the inner diameter D of the outer conductor is approximately 18 mm, said outer conductor being approximately 2 mm thick, can be used.

Figure 2:
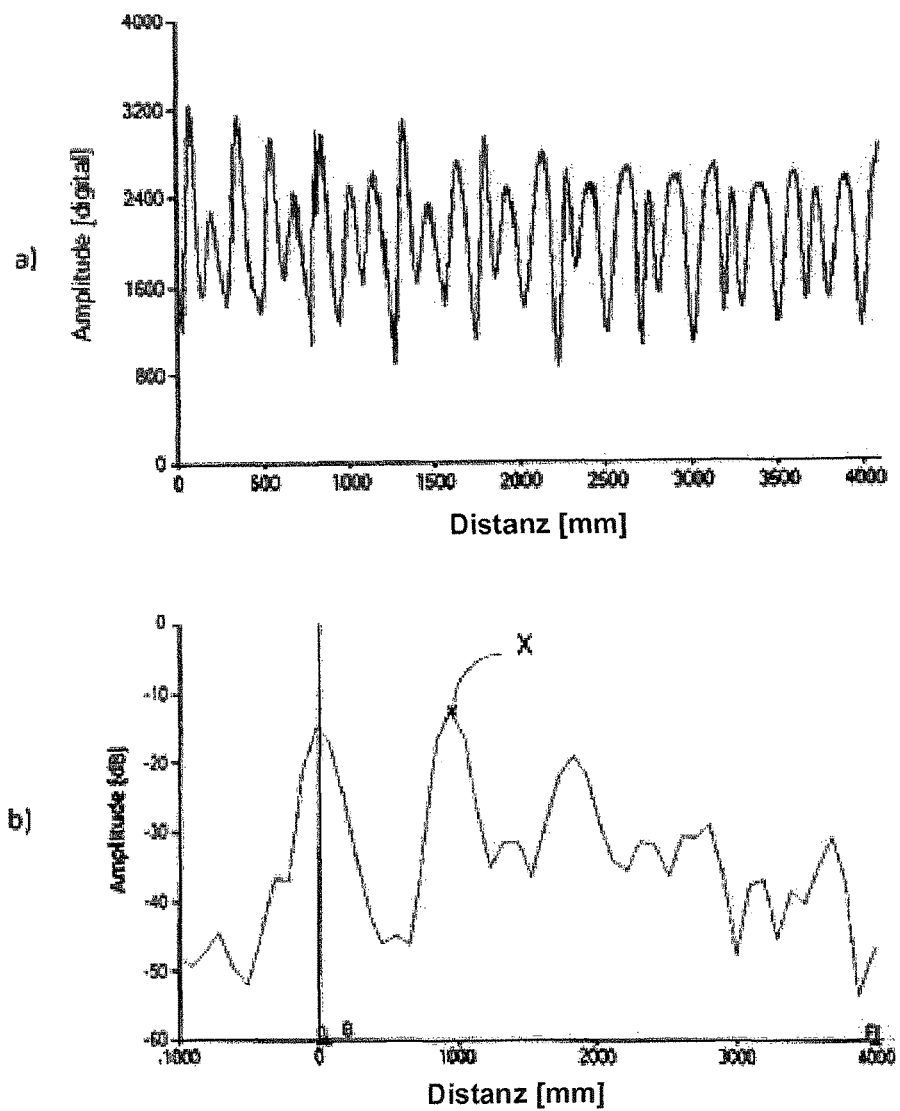

FIG. 2a shows the intermediate frequency signal IF that contains phase information which can be used to increase the accuracy and/or precision of the fill level measurement. The phase information can be extracted from the intermediate frequency signal IF by a number of methods, as disclosed for example in the patent publication DE4407369 A1, where the phase is determined by means of a quadrature demodulation of received pulses with a subsequent low-pass filtering. The desired phase is determined from the quadrature demodulation by taking the arctangent of the quotient of the 0°-output signals and 90°-output signals that result from the low-pass filtering and quadrature demodulation.

FIG. 2b shows a graphical display of the amplitude of an echo signal as a function of distance. The echo peak X of the wanted signal is indicated with an "x". The echo signal corresponds to the intermediate frequency signal IF sampled by an analog to digital converter A/D in an FMCW based radar measurement device 1.

In the as yet unpublished German patent application DE 102013105019.0 filed by Endress+Hauser GmbH+Co. KG on May 16, 2013 and the corresponding PCT applicatation: PCT/EP2014/058090 filed on Apr. 22, 2014, a method is disclosed for conducting a spectral analysis of the frequency components of the intermediate frequency signal IF. The disclosure of this cited application, in particular the disclosure in conjuction with FIGS. 3 to 6, is explicitly incorporated by reference as being a part of the disclosure of the present application for patent.

The frequencies of radar transmission signals TX can be in the range of 4 GHz to 100 GHz, for example. The change in frequency due to modulation can, for example, be a few Giga-Hertz. The time period, in which the frequency is modulated could, for example, be between 0,1 ms and 5 ms. These specifications are given as illustrations of typical magnitudes and are not meant to restrict the invention.

The intermediate frequency signal IF shown in FIG. 2a can be processed by various methods in order to determine the distance of the surface 10 of the material 9 in the container 8. For example, the DC part of the signal can be removed by obtaining an amplitude average of the sampled intermediate frequency signal IF. This average can then be subtracted from the intermediate frequency signal. A windowing operation can then be carried out where the sampled values of the intermediate frequency signal, from which the DC part has been removed, are weighted in order to avoid certain effects that can occur when the observation window is restricted.

A fast fourier transform FFT of the echo signal can then be carried out in order to obtain a real valued time-discrete frequency spectrum shown in FIG. 2b, which contains a frequency peak X for each frequency component contained in the intermediate frequency signal IF. An approximate determination of the placement of these frequency peaks X in the frequency spectrum can be carried out by, for example, comparing the result of the fast fourier transform FFT with a predetermined threshold value to determine which frequencies are expressed strongly enough in the frequency spectrum that they cross the threshold.

A more precise determination of the placement of the frequency peaks X can be carried out with a sort of interpolation method to add additional points in the frequency spectrum that are close to these frequency peaks. The spectral amplitude of these additional points can be determined using a discrete fourier transform DFT, or a generalised goetzel algorithm can be applied. The resolution in the range of approximately located frequency peaks X can thereby be increased. The generalised goetzel algorithm has the added benefit that the respective phases of the the additional points in the frequency spectrum are also determined. A description of the generalised goetzel algorithm can be found in EURASIP Journal on Advances in Signal Processing 2012 2012:56, Sysel and Rajmic, "Goertzel algorithm generalized to non-integer multiples of fundamental frequency." This description of the Generalised Goetzel Algorithm is incorporated by reference in its entirety in the present application for patent.

An algorithm for adding more frequency points to the frequency spectrum and determining the spectral amplitudes at these frequencies in order to find the exact placement of the frequency peak X in the frequency spectrum is described in the earlier cited german application DE 102013105019.

The phase of at the frequency peak X can then be determined. Since the frequency spectrum corresponds to the distance range to be measured by the measurement device 1, the phase at the frequency peak can be compared to the expected phase response of the echo signal at the distance that corresponds to the frequency peak X. The difference between expected phase and determined phase can then be used to correct the distance determination. This method permits a very precise determination of the distance.

Figure 3:
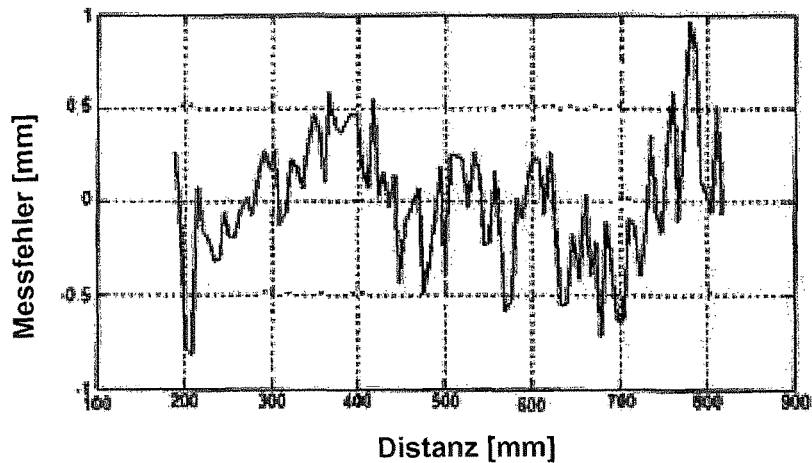
FIG. 3: is a graphical display of the measurement error as a function of distance.

In FIG. 3 a graphical display of the measurement error as a function of distance is shown, wherein the error is difference between the determined distance and the actual controlled distance corresponding to the fill level of a material in a container. As can be seen, the suprising effect of using the FMCW radar methods in combination with a coaxial waveguide probe permit the determination of the fill level with an error of less than ca. +/−0.5 mm. This represents an improvement of 1000% over the measurement accuracy of traditional time-domain reflectometry coaxial waveguide probe based guided radar measurement devices.

The invention claimed is:

1. A radar based fill level measurement device for measuring the fill level of a material in a container, comprising:
    an electronics unit, which serves to generate a transmission signal, and serves to process a received signal, said received signal containing a reflected portion of the transmission signal, said reflected portion being reflected from a surface of the material whose distance is to be measured; and
    a coaxial waveguide probe, wherein:
    said electronics unit comprises a signal generator to generate a frequency modulated transmission signal,
    said electronics unit comprises a processor to process the received signal using phase information comprised in the received signal;
    said processor calculates an expected phase response of the received signal (RX) as a function of the distance of the surface of the material;
    said processor determines the phase of the received signal (RX) at a frequency peak (X) of the received signal; wherein said frequency peak (X) corresponds to said distance, and
    said processor compares said determined phase with the expected phase response at said distance; and
    said coaxial waveguide probe serves for guiding the transmission signal and the received signal.

2. The radar based fill level measurement device according to claim 1, wherein:
    a wave impedence of said coaxial waveguide probe corresponds to an output impedance of said electronics unit.

3. The radar based fill level measurement device according to claim 2, wherein:
    said wave impedance is adjusted through an adjustment of the inner diameter of an outer conductor of said coaxial waveguide probe.

4. The radar based fill level measurement device according to claim 1, wherein:
    said processor determines the placement of the frequency peak (X) in a frequency spectrum of an intermediate frequency signal (IF) by interspersing additional frequency points in between and/or adjacent to sampled frequencies obtained by a fast fourier transform of the intermediate frequency signal (IF) sampled by an analog to digital converter of said electronics unit; and
    said sampled frequencies comprise respective spectral amplitudes that are greater than a predetermined amplitude threshold.

5. Radar based fill level measurement device according to claim 4, wherein:
    said processor performs a discrete fourier transform at the sampled frequencies and additional frequency points.

6. Radar based fill level measurement device according to claim 4, wherein:
    said processor applies a generalized goertzel algorithm at the sampled frequencies and additional frequency points.

7. Radar based fill level measurement device according to claim 1, wherein:
    said processor determines the phase of the frequency peak (X) by applying a generalized goertzel algorithm at an additional frequency point or a sampled frequency in the frequency peak (X); and
    said frequency point or said sampled frequency comprises a greater spectral amplitude than any adjacent frequency point or sampled frequency.

* * * * *